3,139,447
PREPARATION OF FERROUS FERRI-ETHYLENE-
DIAMINE-TETRA-ACETATE AND PROCESS
Georges Nagy, Montrouge, France, assignor to Fabriques
de Produits Chimiques Billault, Paris, France, a corporation of France
No Drawing. Filed Apr. 25, 1961, Ser. No. 105,286
Claims priority, application France May 2, 1960
3 Claims. (Cl. 260—439)

This invention relates to a method of preparing ferri-ethylene-diamine-tetra-acetic acid and ferrous derivatives thereof, and to compositions of matter thus produced.

Ethylene-diamine-tetra-acetic acid in the form of disodium salt, and the chelation compounds of ethylene-diamine-tetra-acetic acid with calcium, magnesium, iron, cobalt and the like, as their corresponding sodium or ammonium salts, are finding increasingly extensive uses in human therapy. Thus the disodium salt of ethylene-diamine-tetra-acetic acid is used for the elimination of undesirable calcium deposits from the organism, while the sodium salt of the calcium, magnesium, iron and cobalt chelates are used as donors of the corresponding metallic elements to deficient organisms. The sodium salt of the calcium chelate is further used to combat heavy-metal poisoning (e.g. lead poisoning), and certain cases of poisoning by radioactive elements such as plutonium.

Among the chelation compounds of iron and ethylene-diamine-tetra-acetic acid, only the sodium and ammonium salts of ferri-ethylene-diamine-tetra-acetic acid (sodium and amonium ferritetetracemates) have to this day been employed in the treatment of anaemic conditions. These chelates are obtained by reacting the alkaline base (sodium or ammonium hydroxide solution) with a stoichiometric mixture of ethylene-diamine-tetra-acetic acid and ferric hydroxide in suspension. The ferri-ethylene-diamine-tetra-acetic acid is prepared by digesting a suspension of ferric hydroxide and ethylene-diamine-tetra-acetic acid.

There are several reasons why iron is more desirably ingested therapeutically in ferrous than in ferric form. Ferrous iron is directly resorbed by the intestinal mucous membrane while trivalent or ferric iron first has to be reduced to the divalent state; the ferrous compounds therefore act faster and more vigorously. Moreover, the ingestion of large doses of ferrous salts has been observed to have a catalytic shock effect on hematopoesis. Accordingly, I have expected that the ferrous salt of ferri-ethylene-diamine-tetra-acetic acid would combine the advantages of the chelated form and of ferrous salts. However, various difficulties were encountered in preparing such a ferrous salt by neutralization of ferri-ethylene-diamine-tetra-acetic acid with ferrous carbonate or hydroxide, in that all precipitation, washing and filtering operations applied to the ferrous hydroxide have to be carried out in the absence of air.

It is an object of this invention to overcome these difficulties and to eliminate the necessity of handling ferric hydroxide throughout the preparation of ferri-ethylene-diamine-tetra-acetic acid.

With this object in view, the invention is based on the observation that the complexes of trivalent metals are stable in a strong acidic medium in contrast to the complexes derived from divalent metals, and that said trivalent metal complexes only commence to dissociate below pH values of about 1.

According to the present invention a method of preparing ferri-ethylene-diamine-tetra-acetic acid comprises digesting ethylene-diamine-tetra-acetic acid (hereinafter sometimes designated by the frequently used abbreviated symbol $H_4Y$) which is insoluble in water, with a hot solution of ferric sulfate and removing the sulfuric acid formed, for example, by precipitation with barium carbonate or calcium carbonate or by subjecting the solution to an ionic screening process by passing it on a highly crosslinked anion exchange resin so as to obtain a pure ferri-ethylene-diamine-tetra-acetic acid solution.

The reaction involved in the method can be written as follows:

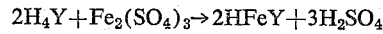
$$2H_4Y + Fe_2(SO_4)_3 \rightarrow 2HFeY + 3H_2SO_4$$

When the clear solution is passed through a column charged with a weakly basic anion exchange resin, the FeY ion is too large to penetrate the meshes of the highly crosslinked polystyrene network and is entirely passed into the effluent, whereas the sulfuric acid is completely retained by the amine groups of the resin.

To prepare the ferrous salt of ferri-ethylene-diamine-tetra-acetic acid, the pure acid solution obtained as above is then neutralized with a slight excess of barium carbonate, filtered and subjected to double decomposition in a neutral medium between the hot barium ferri-ethylene-diamine-tetra-acetate solution and the stoichiometrically corresponding quantity of ferrous sulfate. The reagent medium is again filtered, the barium sulfate precipitate is washed and the solution is dried.

The reactions involved in these operations for obtaining the ferrous ferri-ethylene-diamine-tetra-acetate according to the invention are

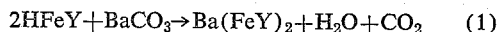
$$2HFeY + BaCO_3 \rightarrow Ba(FeY)_2 + H_2O + CO_2 \quad (1)$$

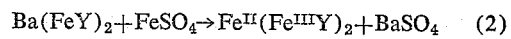
$$Ba(FeY)_2 + FeSO_4 \rightarrow Fe^{II}(Fe^{III}Y)_2 + BaSO_4 \quad (2)$$

Ferrous ferri-ethylene-diamine-tetra-acetate is thus produced in the form of a greenish-brown powder of astringent flavour, highly soluble in water. The aqueous solutions are slightly acidic (pH 4.8 for the 5% solution) and are stable to hydrolysis even at boiling temperature in an inert atmosphere. The formula $Fe^{II}(Fe^{III}Y)$ indicates a molecular weight of 744 and an iron content of 22.54%, whereof 7.51% is in the ferrous state.

Two examples will now be given of detailed procedures for performing the method of the invention.

*Example 1*

584 g. (2 moles) of pure ethylene-diamine-tetra-acetic acid and 2 liters of a hot ferric sulfate solution containing exactly 2 gram-atoms of iron were placed in a five-liter beaker. The beaker was heated to 80° C. and agitated to complete dissolution. 870 g. (4.4 moles) of precipitated barium carbonate were then added and agitation was continued for one hour, whereupon the barium sulfate precipitate was filtered off on a Buchner filter. The filter cake was thoroughly washed, the washing water was combined with the filtrate and the barium was determined in one aliquot part of the solution.

The barium ferri-ethylene-diamine-tetra-acetate solution was then poured into a four-necked flask fitted with a stirrer, a dropping funnel, a glass capillary tube and a mercury-sealed outlet tube, displaced with a blast of nitrogen, and the aqueous solution of ferrous sulfate in calculated amount was added dropwise. The mixture was allowed to stand some hours, filtered and the precipitate washed. The solution was concentrated in vacuo while bubbling a slow current of nitrogen through the capillary and finally the concentrated solution was evaporated to dryness.

*Example 2*

The solution of ferri-ethylene-diamine-tetra-acetic acid and sulfuric acid obtained as in the first example was passed through a column containing 4 liters of a weakly basic anion exchange resin of the styrene divinylbenzene type, at a flow-rate of 2 liters per hour. The column was then rinsed with 4 liters water. The effluent was pure ferri-ethylene-diamine-tetra-acetic acid which was neutralized with barium carbonate as in the first example. The ferrous ferri-ethylene-diamine-tetra-acetate solution was also prepared as in Example 1.

In a modified process, the major part of the sulfuric acid was precipitated as calcium sulfate by adding 300 g. (3 moles) of precipitated calcium carbonate to the solution in small portions. The solution was filtered, the precipitate was washed and the small quantity of dissolved $CaSO_4$ was removed by passing the product first over a strongly acidic cation exchange resin of the styrene-divinylbenzene type in the hydrogen cycle, then over a weakly basic anion exchange resin in the hydroxyl cycle.

The ferrous ferri-ethylene-diamine-tetra-acetate prepared by either process showed high effectiveness in the treatment of anaemia, chlorotic conditions, ataraxia and asthaenia by oral ingestion in doses of from 0.5 to 1.0 gram per diem.

What I claim is:

1. The method of preparing ferrous ferri-ethylene-diamine-tetra-acetate which consists of reacting about two mols of ethylene-diamine-tetra-acetic acid with an aqueous solution of about one mol of ferric sulfate at elevated temperatures, removing the sulfuric acid from the reaction mixture by treatment with a material selected from the group consisting of (1) barium carbonate, (2) calcium carbonate and (3) a weakly basic anion exchange resin, separating a pure ferri-ethylene-diamine-tetra-acetic acid solution, neutralizing said acid solution with barium carbonate, filtering, recovering a barium ferri-ethylene-diamine-tetra-acetate solution, reacting with the stoichiometric amount of a solution of ferrous sulfate in an inert atmosphere, and recovering said ferrous ferri-ethylene-diamine-tetra-acetate.

2. The method of claim 1, wherein the sulfuric acid is removed by treatment with a weakly basic anion exchange resin.

3. The method of preparing ferrous ferri-ethylene-diamine-tetra-acetate which consists of reacting about two mols of ethylene-diamine-tetra-acetic acid with an aqueous solution of about one mol of ferric sulfate at elevated temperatures, neutralizing with barium carbonate, recovering a barium ferri-ethylene-diamine-tetra-acetate solution, reacting with the stoichiometric amount of a solution of ferrous sulfate in an inert atmosphere, and recovering said ferrous ferri-ethylene-diamine-tetra-acetate.

References Cited in the file of this patent

UNITED STATES PATENTS

| | | |
|---|---|---|
| 2,816,060 | Carter | Dec. 10, 1957 |
| 2,859,104 | Kroll et al. | Aug. 19, 1958 |
| 2,893,916 | Rubin | July 7, 1959 |
| 2,898,359 | Leedham | Aug. 4, 1959 |
| 2,898,360 | Hogan | Aug. 4, 1959 |
| 2,906,762 | Knell et al. | Sept. 29, 1959 |
| 2,936,316 | Young | May 10, 1960 |
| 2,943,100 | Holstein | June 28, 1960 |
| 3,050,539 | LeBlanc | Aug. 21, 1962 |

FOREIGN PATENTS

| | | |
|---|---|---|
| 785,024 | Great Britain | Oct. 23, 1957 |

OTHER REFERENCES

The Pharmaceutical Journal, vol. 181, page 60, July 26, 1958.

Brintzinger et al.: Zeitschrift fur An. und alleg. Chemie, Band 251 (1943), pp. 289 and 290.

Jacobson: Plant Physiology, vol. 26, No. 2, pp. 411–13 (1951).